United States Patent [19]

Stark et al.

[11] Patent Number: 5,543,582
[45] Date of Patent: Aug. 6, 1996

[54] LIQUID TIGHT CORD GRIP

[76] Inventors: Thomas S. Stark, 7635 NW. 51st Pl., Coral Springs, Fla. 33067; Thomas J. Gretz, 1102 Oakmont Rd., Clarks Summit, Pa. 18411; Daniel J. O'Neil, R.R.#1, Box 2292, Moscow, Pa. 18444

[21] Appl. No.: 448,184

[22] Filed: May 23, 1995

[51] Int. Cl.⁶ .................. H02G 3/22; F16L 17/02
[52] U.S. Cl. ............. 174/65 SS; 285/343; 285/382.7; 285/906
[58] Field of Search .................. 285/342, 343, 285/382.7, 906; 174/65 SS

[56] References Cited

U.S. PATENT DOCUMENTS

| | | | |
|---|---|---|---|
| 1,983,840 | 12/1934 | Dohner | 285/382.7 X |
| 2,511,134 | 6/1950 | Stranberg | 285/382.7 X |
| 4,250,348 | 2/1981 | Kitagawa | 285/343 X |
| 4,647,086 | 3/1987 | Maxwell et al. | 285/342 |

FOREIGN PATENT DOCUMENTS 1604202  3/1987  United Kingdom ............ 174/65 SS

*Primary Examiner*—Dave W. Arola

[57] ABSTRACT

A cord grip in which two screw fittings provide a variable volume chamber for compressing a flexible soft durometer grommet held within a flexible annular cord gripping member. The cord gripping member is of a harder durometer than the grommet and has a plurality of fingers for gripping the cord. The combination of the hard durometer cord gripping member and the soft durometer grommet provides positive gripping action and a liquid tight seal on the cord when the variable volume chamber within the fittings is in the compressed state.

7 Claims, 1 Drawing Sheet

5,543,582

LIQUID TIGHT CORD GRIP

FIELD OF THE INVENTION

This invention relates to cord grips and in particular to a four piece liquid tight grip including two interconnecting threaded fittings of hard plastic or metal, a cord gripping member of flexible medium hardness plastic-like material, and a cord sealing member of a flexible elastomeric material.

BACKGROUND OF THE INVENTION

Water tight cord grips are a well known type of cord fitting. Some of the present designs include grommets that provide water tightness when squeezed by internal tapers when the fitting is tightened to grip a cable. Heretofore, cord grips that were liquid tight were of many different designs in a crowded art but still there is room for improvement in one or more areas including simplicity, ease of use, ease of manufacture, improved performance in accommodating a size of cords and so forth.

SUMMARY OF THE INVENTION

This invention provides a cord grip that consists of four interacting parts that provide positive cord gripping action and a liquid tight sealing action between the cord and the grip. The invention is very economical to mass produce as each of the four separate parts may easily be manufactured by a simple casting procedure.

OBJECTS AND ADVANTAGES

An object of the invention is to provide a simple and practical cord grip the parts of which may be cast and economically mass produced.

Another object is to provide a cord grip that is easy for the customer to apply and use.

Another object is to provide a cord grip that can handle a wide range of cord diameters.

Another object is to provide a cord grip that provides a positive locking action on the cord preventing an undesired retraction of the cord from the grip.

Another object of the invention is to provide a liquid tight seal between the cord and the cord grip.

Other objects and advantages of the present invention will be better understood from the following description when read in conjunction with the appropriate drawings.

DESCRIPTION OF THE INVENTION

Figure 2:
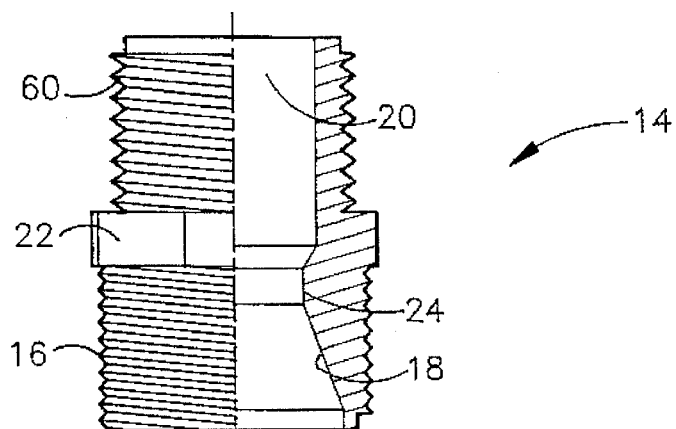
FIG. 2 is a view of the first fitting with the right side cutaway to show the interior.

A first fitting or sleeve 14 depicted in FIG. 2 may be molded from rigid plastic-like material or metal. A passageway 20 extends through the sleeve 14 and includes an inclined or tapered conical surface 18. The inclined surface 18 extends around the inner periphery of the sleeve and resembles an inner surface of a truncated cone. The sleeve 14 has a necked down area 24 adjoining the top edge or smallest diameter of the inclined surface 18. The sleeve 14 has external threads 16 at one end to facilitate connection with a second fitting and external threads 60 at its opposite end to facilitate connection to a box, panel, etc. through a standard hole either by the use of a threaded hole or a lock nut together with a watertight washer (not shown). A section intermediate the two ends of sleeve 14 has a raised polygonal surface 22 to facilitate tightening with a wrench or similar tool.

Figure 3:
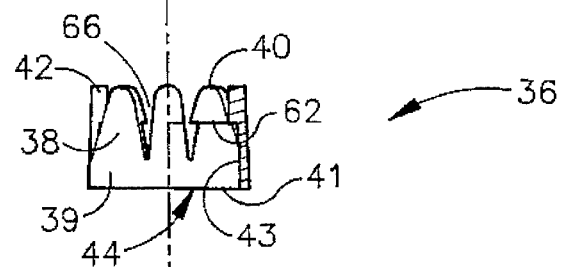
FIG. 3 is a view of the cord gripping member with the right side cutaway.

An annular cord gripping member 36 depicted in FIG. 3 may be molded of any flexible plastic of medium hardness and has a passageway 44 therethrough and a plurality of fingers 38 integral with its base 39. Fingers 38 contain tabs 42 that extend from the end of the fingers toward a central axis of the cord gripping member 36. The fingers contain tips 40 and an abutment edge or shoulder 62 as part of each tab 42. The tab is thicker than the rest of the finger by the width of the shoulder 62. The shoulders 62 all lie in the same plane that extends transverse to the central axis of the cord grip assembly. The cord gripping member 36 has a base edge or face 41 at the lower end of the circular base 39.

Figure 4:
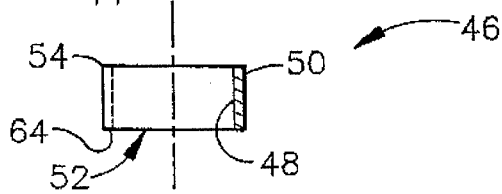
FIG. 4 is a view of the grommet having the right side cutaway.

FIG. 4 depicts an annular sealing member or grommet 46 which is typically molded of a flexible and soft elastomeric material. The hardness or durometer of the grommet is of a lower value than that of the cord gripping member 36 depicted in FIG. 3 which is in turn of a lower hardness or softer durometer than the sleeve 14. The grommet 46 has an external sealing surface 50 on its outer circumference, a rear sealing face 64 at its lower end and an inner sealing surface 48 on its inner circumference. A passageway 52 extends through the grommet 46. The grommet has a forward edge or face 54 shown at the top of FIG. 4. The grommet is the same thickness in its relaxed or non-compressed state as the depth of the shoulder 62 of cord gripping member 36. Likewise, the relaxed length and diameter is approximately equal to the distance from shoulder 62 to base face 41 and the inner diameter of cable passageway 34 through the cap 26, respectively. It is to be noted that fingers 38 taper to rounded out tips 40 and that they are separated by slots 66 that taper from a point adjacent circular base 39 to diverge to their greatest width at the tips 40. This permits the fingers to cantilever inward a great distance until the sides of the tips 40 touch one another.

Figure 5:
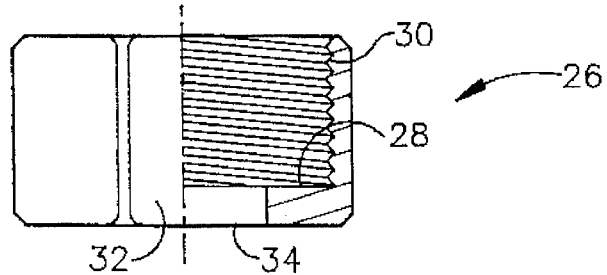
FIG. 5 is a view of the second fitting with the right side cutaway.

A second fitting or cap 26 is shown in FIG. 5. The cap 26 is not continuous but has a passageway 34 therethrough. The cap has internal threads 30 and a flat compression surface 28. A polygonal surface 32 is provided on the exterior surface of the cap 26 to permit tightening with a wrench or similar tool.

Figure 1:
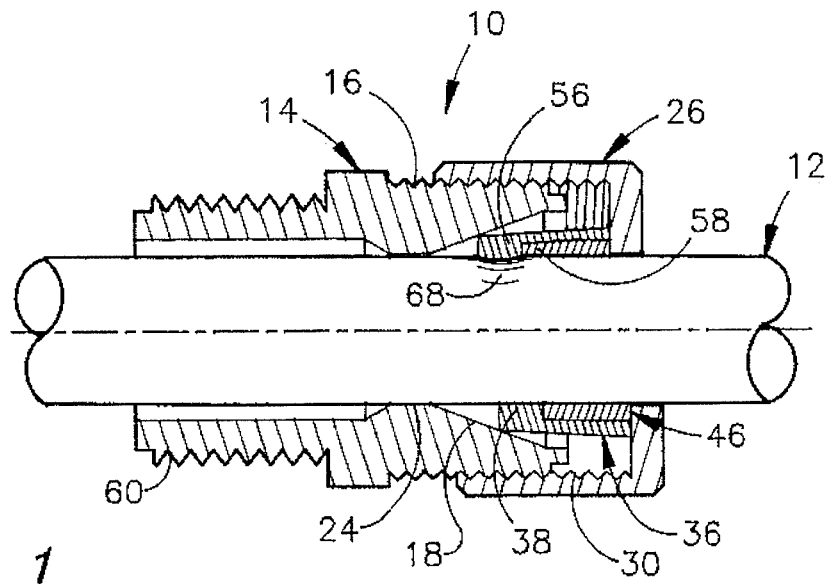
FIG. 1 is a frontal view of the cord grip of the present invention with a cutaway section showing at the bottom the variable volume chamber in an uncompressed state and at the top in the compressed state.

FIG. 1 shows a cutaway view of the sleeve 14, cap 26, cord gripping member 36, and grommet 46 and how they interact to form the present invention. The grommet 46 is typically pressed into the cord gripping member 36 where it bottoms on shoulders 62. The tabs 42 on the fingers 38 of the cord gripping member form a cage which acts to hold the grommet within the cord gripping member. The grommet 46 slides into the cord gripping member 36 until the shoulders 62 at the base of the tabs 42 holds the grommet 46 from further entry. At this point, base face 41 of the cord gripping member 36 and the rear sealing face 64 of the grommet 46 lie in the same plane. The sleeve 14, cord gripping member 36 with the grommet 46 inserted therein, and the cap 26 are then slid onto a cord. The cap 26 is then loosely threaded onto the mating end of the sleeve 14 so that internal threads 30 of the cap 26 are engaging external threads 16 of the sleeve 14. Alternately, the sleeve 14, cord gripping member 36 with the grommet 46 inserted therein, and the cap 26 may be assembled loosely together first and then the cord inserted therein, the net result being the same.

The assembled sleeve 14, cap 26, grommet 46, and cord gripping member 36 are shown in FIG. 1 with the cord 12. The bottom half of FIG. 1 shows the separate pieces comprising the cord grip 10 in the uncompressed state and the top half of FIG. 1 shows the same components in the compressed state. In the uncompressed state the cord gripping member 36 abuts the interior flat surface 28 of the cap 26 at its base face 41. The grommet 46 also abuts the flat surface 28 of the cap 26 at the sealing face 64 of the grommet. The tips 40 of fingers 38 contact the inclined surface 18 of the sleeve 14. The forward face 54 of grommet 46 is held by the shoulders 62 of the tabs 42 on fingers 38.

Further tightening of the sleeve 14 into the cap 26 causes the interior flat surface 28 to push both the base face 41 of the cord gripping member and the face 64 of the grommet into the sleeve 14. This causes fingers 38 of the cord gripping member 36 to slide down the inclined surface 18 and be pivoted or forced inwardly toward the central axis of the cord 12. The tightening action also causes a compression inwardly of the grommet 46 so that the external sealing surface 50 of the grommet 46 seals against the inner surface 43 of the cord gripping member 36. It is to be noted that the compression and movement of the grommet 46 is inward and not longitudinal since it is held from longitudinal movement by shoulders 62 and flat surface 28. The inner surface 48 of the grommet 46 also seals against the surface of the cord 12. In addition, compression of the grommet 46 causes it to seal at its rear sealing face 64 to the flat compression surface 28 of the cap 26. The tightening action is continued until the tabs 42 of fingers 38 create a firm but non-invasive bite 68 into the cord 12 as seen in FIG. 1 at the upper half. The cord 12 is then locked in place in the cord grip 10. The cord gripping member 56 and the grommet 58 in their compressed states are shown in the top half of FIG. 1. The cord is in a liquid tight fit as a result of compression of the grommet 46, which is of a softer durometer than the cord gripping member 36.

The sleeve 14 and the cap 26 are both rigid hard members of plastic or metal and the cord gripping member 36 is a resilient softer member of moderately firm plastic. The grommet is a soft rubber-like or elastomeric member that is readily deformable. The preferred material and their source for these different components are:

a) sleeve 14 and cap 26: type of material: nylon material #600AZIP22 available from: Texapol Corporation Lower Nazareth Commercial Park 177 Mikron Road Bethlehem, Pa. 18107 b) grommet 46: type of material: sanoprene material #20187 available from: Advanced Elastomer Systems 7715 South 78th Avenue Bridgeview, Ill. 60455 c) cord gripping member 36: type of material: poly propylene material #59139 available from: Marsh Plastic 4043 Maple Road Amherst, N.Y. 14226

While the grip is shown with two interfitting parts, the sleeve 14 and cap 26, threaded together to define a variable bottom compression chamber with the sleeve 14 having an inclined surface and the cap 26 having a flat pushing or compression surface 28, such may be reversed so the inclined surface is on the cap and the flat surface is on the sleeve.

Having thus described the invention with reference to a preferred embodiment, it is to be understood that the invention is not so limited by the description herein but is defined as follows by the appended claims.

What is claimed is:

1. A cord grip comprising:

a variable volume compression chamber defined by two interfitting parts threaded together and having a cord passage therethrough with one of said interfitting parts having an internal inclined surface and the other of said interfitting parts having a flat compression surface;

an annular cord gripping member with a passage therethrough disposed within said variable volume chamber with said cord gripping member being molded of a flexible plastic material;

a circular base member at one end of said cord gripping member, said base member having a base extending toward said flat compression surface;

a plurality of fingers integral with said cord gripping member and extending from said circular base in the direction of said internal inclined surface;

a tab at the end of each finger extending radially inwardly to grip a cord;

a shoulder on each tab extending radially inwardly; and an annular cord sealing member having a forward edge and a rear face with a passage therethrough and disposed within said cord gripping member so that said forward edge rests on said shoulder and said rear face is in contact with said flat compression surface, said cord sealing member being of a flexible elastomeric deformable material that is softer than said cord gripping member, whereby a liquid tight seal is created by tightening said two interfitting members together to decrease the volume of said compression chamber around a cord to cause compression and deformation of said cord sealing member against the cord to create a seal around the cord and to cause said tabs of said cord gripping member to close against and grip the cord.

2. The cord grip of claim 1 wherein said rear face and said base face are coplanar.

3. The cord grip of claim 1 wherein the thickness of the wall of said annular sealing member is the same as the radial depth of said shoulder.

4. The cord grip of claim 1 wherein said rear face of said annular cord sealing member and said base face of said cord gripping member are coplanar and the thickness of said wall of said annular sealing member is the same as the radial depth of said shoulder on each of said tabs extending inwardly toward the central axis of said annular members, whereby tightening of said interfitting part having a flat compression surface in the direction of said interfitting part having an internal inclined surface causes said flat compression surface to contact both said rear face of said annular cord sealing member and said base face of said cord gripping member simultaneously with further tightening of said interfitting part having a flat compression surface in the direction of said interfitting part having an internal inclined surface causing said fingers to contact said inclined surface with further tightening of said interfitting parts causing said interfitting parts thereby carrying said cord sealing member toward a cord disposed with said cord passage.

5. The cord grip of claim 1 wherein one interfitting part is a sleeve having an external threaded connector section, external thread flange and an internal inclined surface and the other part being a cap with internal threads and a flat internal surface.

6. The cord grip of claim 5 wherein said rear face of said annular cord sealing member and said base face of said cord gripping member are coplanar and the thickness of said wall of said annular sealing member is the same as the radial depth of said shoulder on each of said tabs extending inwardly toward the central axis of said annular members, whereby tightening of said cap having a flat internal surface against said sleeve having an internal inclined surface causes said flat internal surface to contact both said rear face of said annular cord sealing member and said base face of said cord gripping member simultaneously, further tightening of said cap having a flat internal surface against said sleeve having an internal inclined surface forces said fingers to contact said inclined surface, further tightening of said cap and said sleeve causes said fingers to move inwardly toward the central axis of said cap and sleeve thereby carrying said cord sealing member toward a cord disposed within said cord passage.

7. The cord grip of claim 6 wherein said fingers are tapered and separated by diverging slots with said fingers and said annular cord sealing member being substantially confined to transverse movement without substantial longitudinal movement.

* * * * *